US009365231B1

(12) United States Patent
Rajput

(10) Patent No.: US 9,365,231 B1
(45) Date of Patent: Jun. 14, 2016

(54) WHEELED BABY CARRIAGE WITH AN ACTIVITY TRAY

(71) Applicant: Mara Rajput, Silver Springs, FL (US)

(72) Inventor: Mara Rajput, Silver Springs, FL (US)

(*) Notice: Subject to any disclaimer, the term of this patent is extended or adjusted under 35 U.S.C. 154(b) by 0 days.

(21) Appl. No.: 14/821,397

(22) Filed: Aug. 7, 2015

(51) Int. Cl.
*B62B 1/00* (2006.01)
*B62B 9/24* (2006.01)
*B62B 7/06* (2006.01)
*B62B 9/10* (2006.01)
*B62B 9/12* (2006.01)

(52) U.S. Cl.
CPC ... *B62B 9/24* (2013.01); *B62B 7/06* (2013.01); *B62B 9/102* (2013.01); *B62B 9/12* (2013.01)

(58) Field of Classification Search
CPC .................................. B62B 3/02; B62B 7/08
USPC ................. 280/33.993, 47.38, 639, 642–644, 280/647–650, 658; 297/195.13, 218.1, 297/218.2, 218.3, 219.12, 440.11
See application file for complete search history.

(56) References Cited

U.S. PATENT DOCUMENTS

| 2,427,550 A | 9/1947 | Collura |
| 2,586,495 A | 2/1952 | Woods |
| 2,606,593 A | 8/1952 | Beurskens |
| 5,056,869 A * | 10/1991 | Morrison .............. A47D 15/006 297/467 |
| 6,666,473 B2 * | 12/2003 | Hartenstine ............ A47D 13/06 280/642 |
| 7,025,364 B1 * | 4/2006 | Clarke .................... A47D 13/04 280/47.38 |
| 8,104,780 B1 * | 1/2012 | McConnell-Copploe ............... A47D 13/043 280/47.371 |
| 8,505,957 B2 * | 8/2013 | Bizzell ..................... B62B 7/06 280/642 |
| 2003/0218366 A1 * | 11/2003 | Rho ....................... A47D 1/002 297/153 |

* cited by examiner

*Primary Examiner* — John Walters
*Assistant Examiner* — James Triggs
(74) *Attorney, Agent, or Firm* — Crossley & Stevenson IP Law

(57) ABSTRACT

A wheeled baby carriage with an activity tray including a collapsible wheeled carriage having a handle, a foldable support frame, a plurality of wheels, a rearward facing storage compartment attached to the support frame, a forward facing beverage tray hingedly attached to the handle, and a sunshade hingedly attached to the support frame. A baby seat is rotatably attached to the support frame, and a circular tray is continuously disposed atop the baby seat. The tray has a first half and a removable second half selectively engaged with the first half. An adjustable foot stand is attached to the support frame underneath the baby seat. A removable storage tray is slidably disposed within the support frame underneath the foot stand.

3 Claims, 6 Drawing Sheets

WHEELED BABY CARRIAGE WITH AN ACTIVITY TRAY

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of wheeled baby carriages are known in the prior art. However, what has been needed is a wheeled baby carriage with an activity tray including a collapsible wheeled carriage, a foldable support frame, a rearward facing storage compartment attached to the support frame, a forward facing beverage tray hingedly attached to the handle, and a sunshade hingedly attached to the support frame. What has been further needed is a baby seat rotatably attached to the support frame, a circular tray continuously disposed atop the baby seat, an adjustable foot stand attached to the support frame underneath the baby seat, and a removable storage tray slidably disposed within the support frame underneath the foot stand. Lastly, what has been needed is for a seat support of the baby seat to be configured to allow the baby to rotate in a range of 180 degrees to 360 degrees while the baby is sitting in a seat base of the baby seat. The wheeled baby carriage with an activity tray thus provides a baby with entertainment and exercise while seated in a baby carriage.

FIELD OF THE INVENTION

The present invention relates to wheeled baby carriages, and more particularly, to a wheeled baby carriage with an activity tray.

SUMMARY OF THE INVENTION

The general purpose of the present wheeled baby carriage with an activity tray, described subsequently in greater detail, is to provide a wheeled baby carriage which is not anticipated, rendered obvious, suggested, or even implied by prior art, either alone or in combination thereof.

To accomplish this, the present wheeled baby carriage with an activity tray includes a collapsible wheeled carriage having a handle, a foldable support frame, a plurality of wheels, a rearward facing storage compartment attached to the support frame, a forward facing beverage tray hingedly attached to the handle, and a sunshade hingedly attached to the support frame. The plurality of wheels is optionally four. A baby seat has a circular seat support rotatably attached to the support frame, an immovable seatback disposed atop the seat support, an elasticized seat base continuously attached to the seat support, and a pair of apertures disposed within the seat base. Each of the pair of apertures is configured to allow the passage of each of a pair of legs of a baby. The seat support of the baby seat is configured to allow the baby to circularly rotate in a range of 180 degree to 360 degrees while the baby is sitting in the seat base of the baby seat.

A circular tray is continuously disposed atop the seat support. The tray has a first half and a removable second half selectively engaged with the first half. A perimeter of the first half is equal to a perimeter of the second half. The tray is configured to hold a plurality of interchangeable and removable toys and activities to entertain the baby. An adjustable foot stand is attached to the support frame underneath the baby seat. The foot stand is optionally circular. A removable storage tray is slidably disposed within the support frame underneath the foot stand. An adjustable harness has a top end attached to a top edge of the seatback and a bottom end selectively engageable with a safety latch disposed on the seat base. The harness is configured to hold the baby in the baby seat when the eat support of the baby seat is stationary.

Thus has been broadly outlined the more important features of the present wheeled baby carriage with an activity tray so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
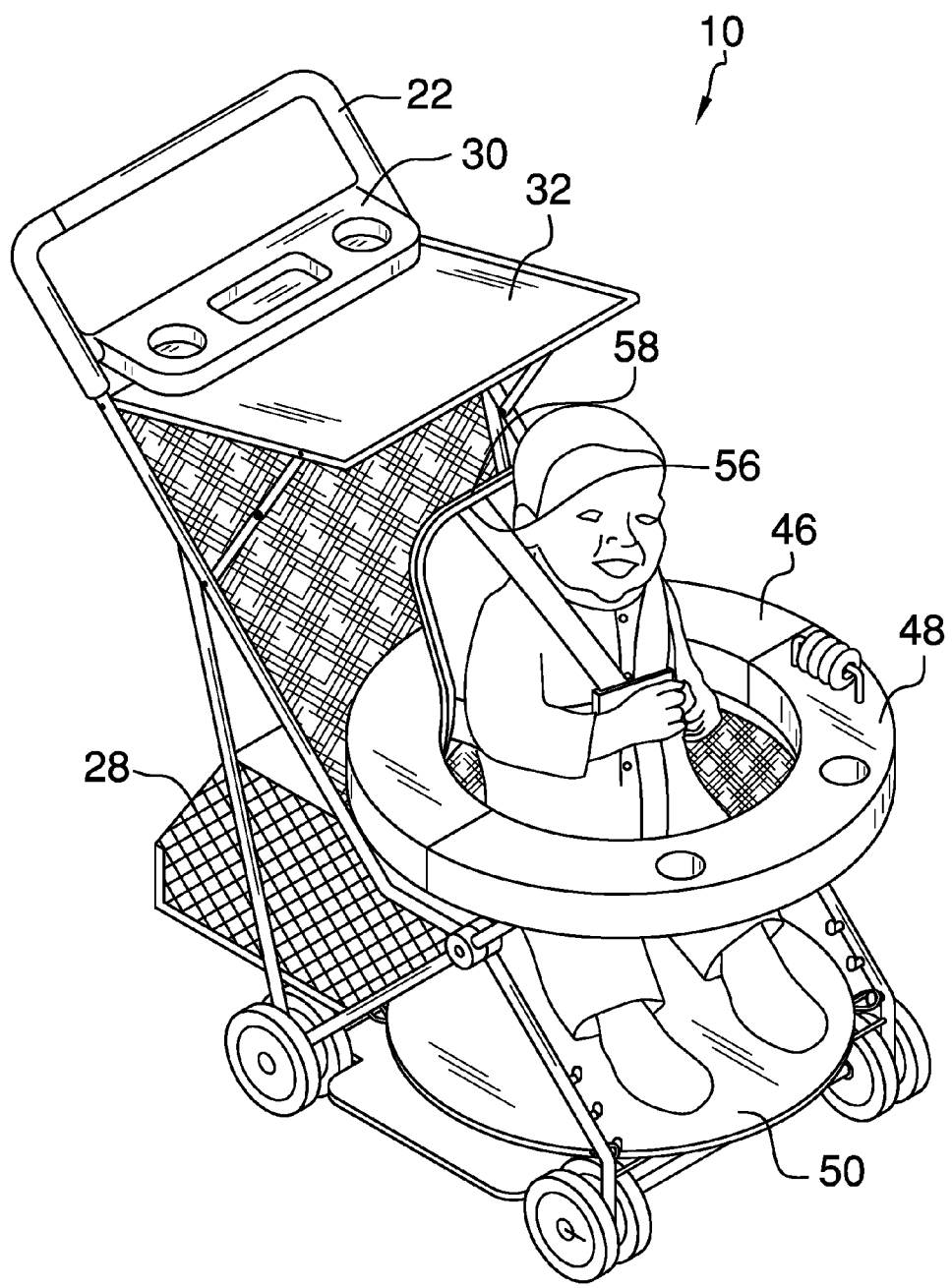
FIG. 1 is a front isometric view.
Figure 2:
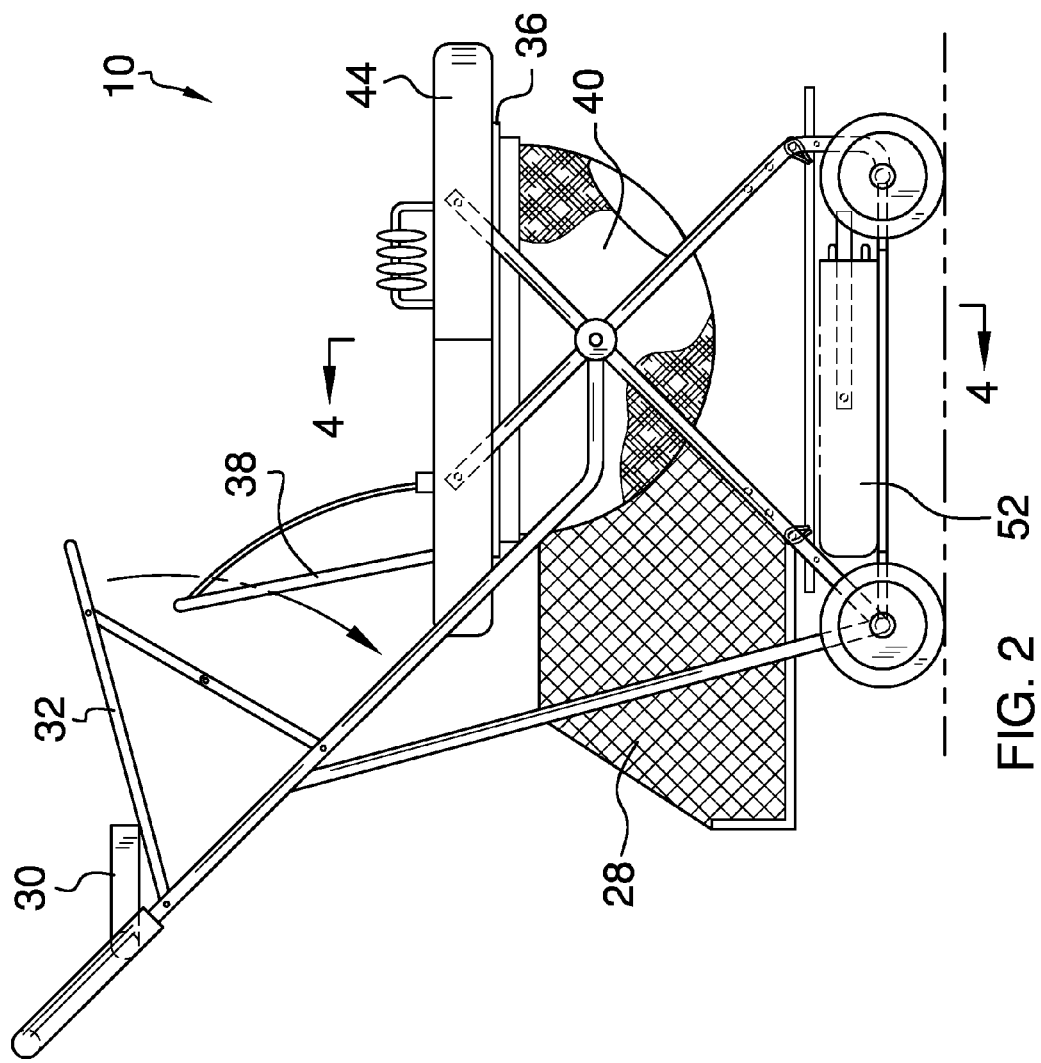
FIG. 2 is a side elevation view.
Figure 3:
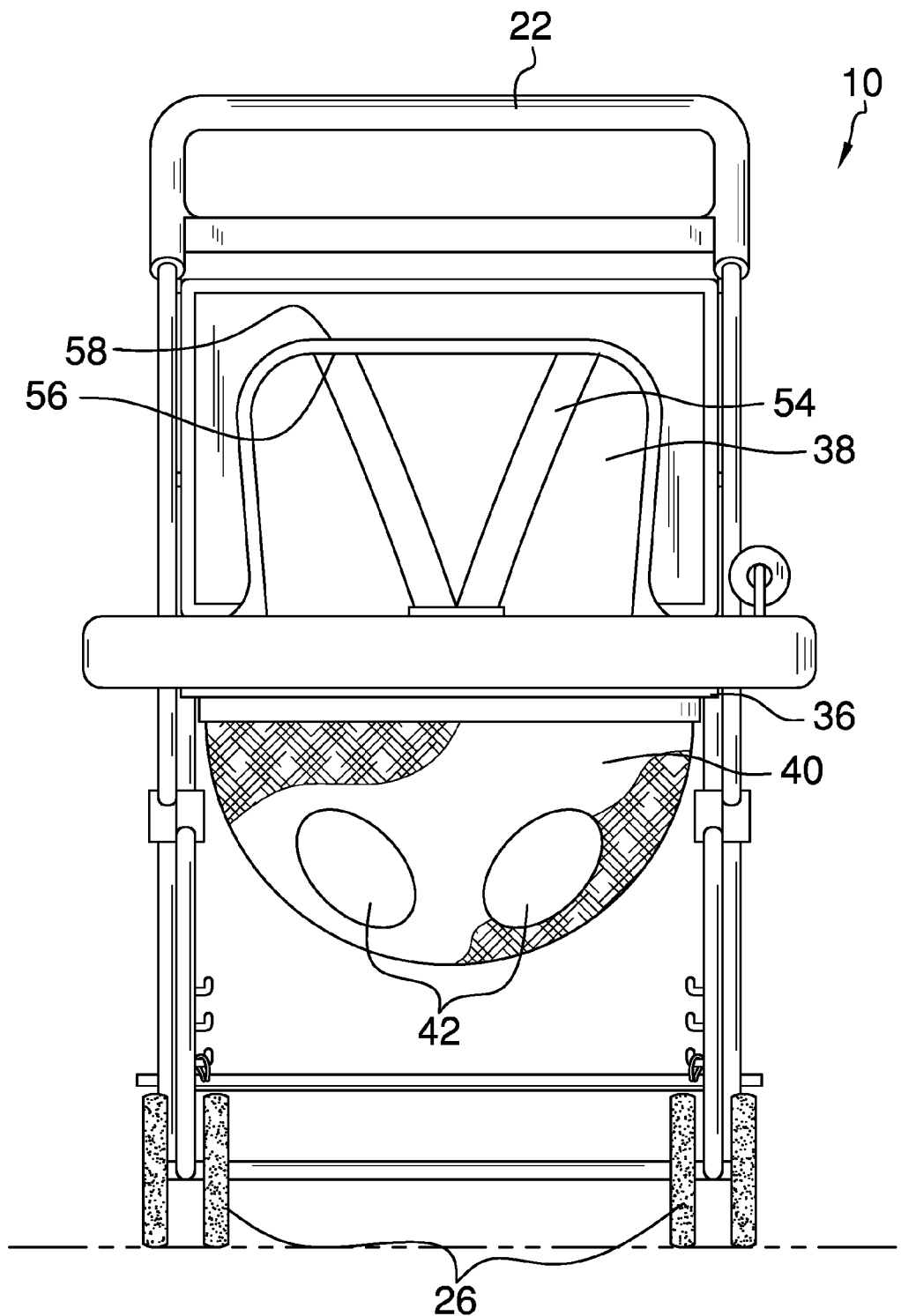
FIG. 3 is a front elevation view.
Figure 4:
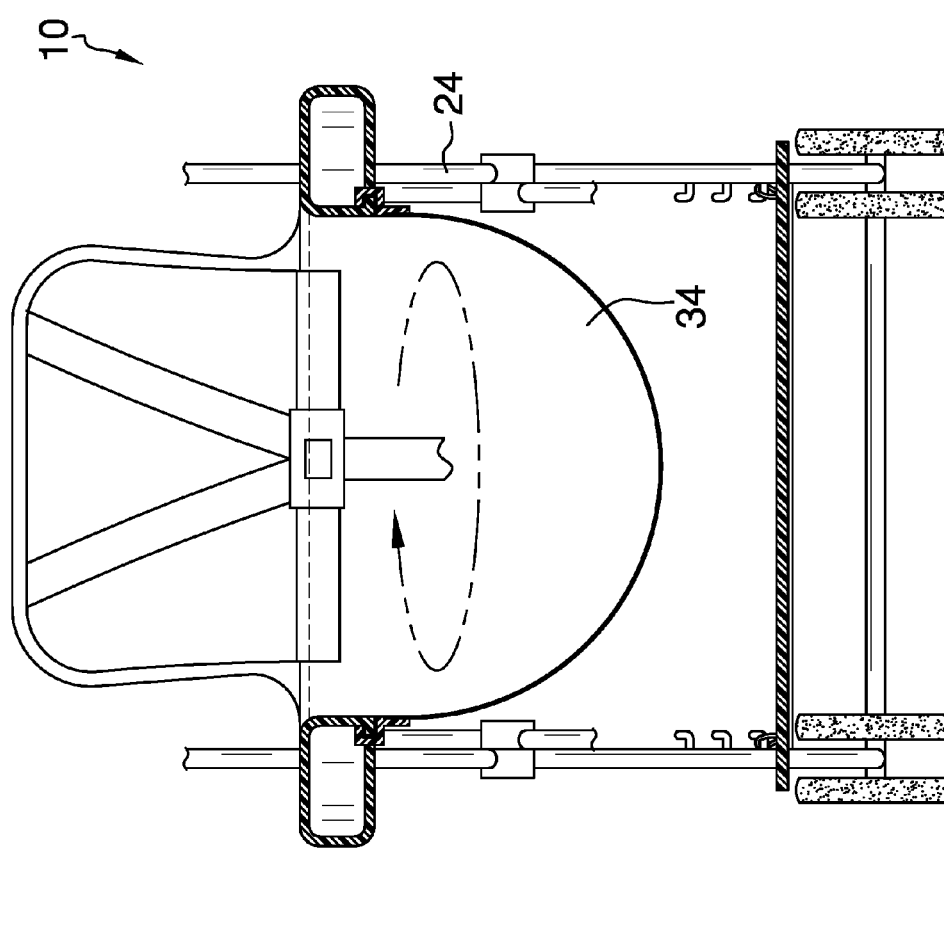
FIG. 4 is a rear elevation view.
Figure 5:
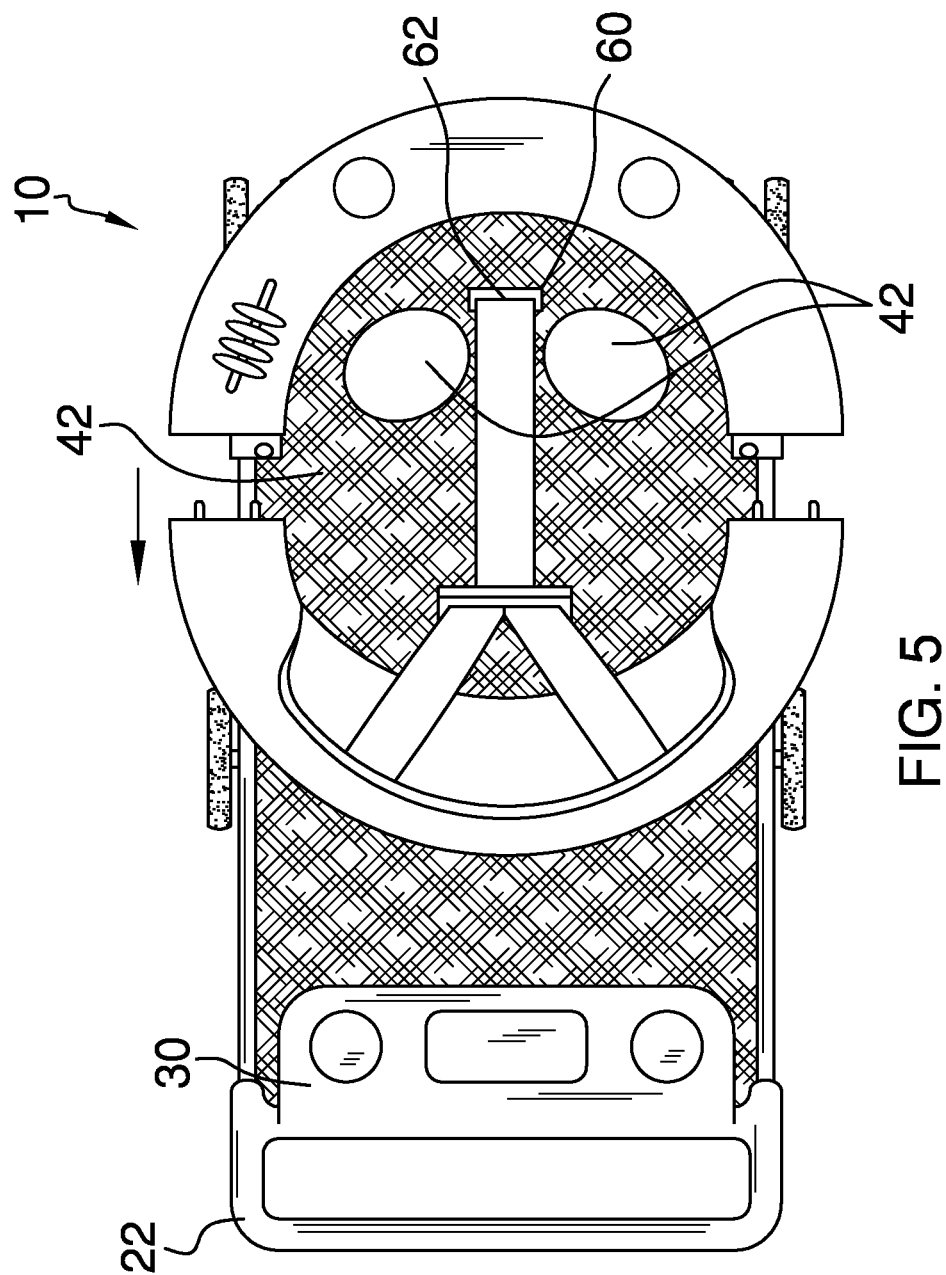
FIG. 5 is a top plan view.
Figure 6:
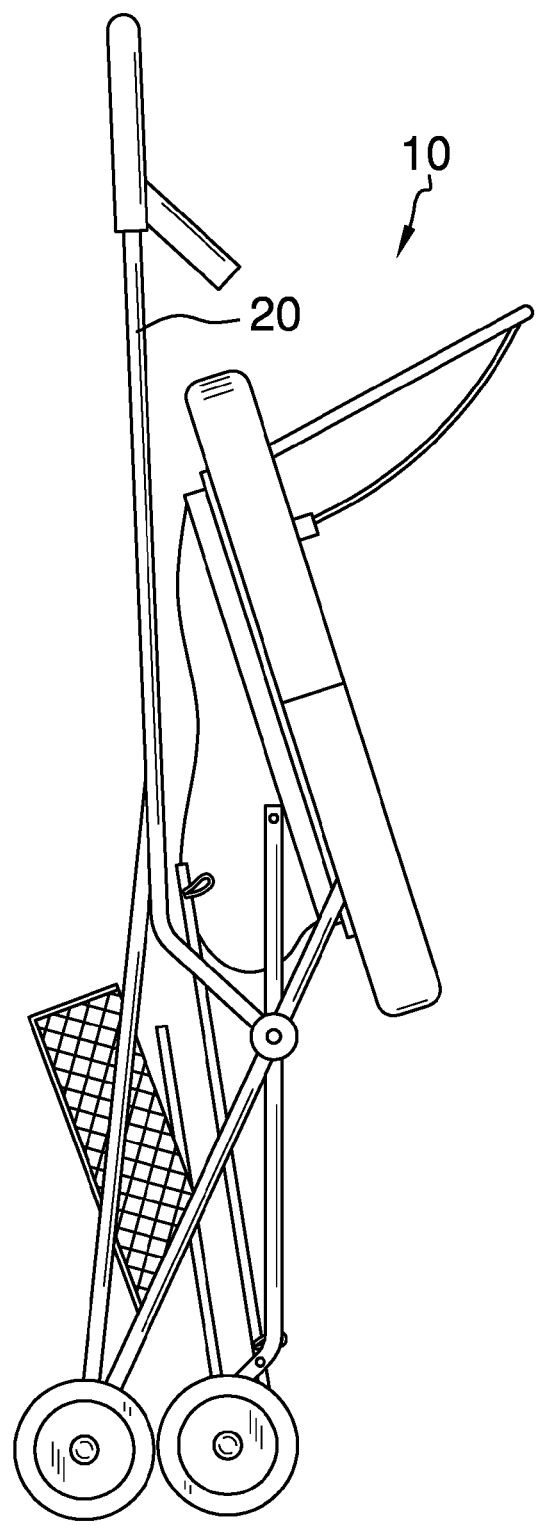
FIG. 6 is a side elevation view showing a wheeled carriage in a collapsed position.

With reference now to the drawings, and in particular FIGS. 1 through 6 thereof, an example of the instant wheeled baby carriage with an activity tray employing the principles and concepts of the present wheeled baby carriage with an activity tray and generally designated by the reference number 10 will be described.

Referring to FIGS. 1 through 6 the present wheeled baby carriage with an activity tray 10 is illustrated. The wheeled baby carriage with an activity tray 10 includes a collapsible wheeled carriage 20 having a handle 22, a foldable support frame 24, a plurality of wheels 26, a rearward facing storage compartment 28 attached to the support frame 24, a forward facing beverage tray 30 hingedly attached to the handle 22, and a sunshade 32 hingedly attached to the support frame 24. The plurality of wheels 26 is optionally four. A baby seat 34 has a circular seat support 36 rotatably attached to the support frame 24, an immovable seatback 38 disposed atop the seat support 36, an elasticized seat base 40 continuously attached to the seat support 36, and a pair of apertures 42 disposed within the seat base 40.

A circular tray 44 is continuously disposed atop the seat support 36. The tray 44 has a first half 46 and a removable second half 48 selectively engaged with the first half 46. An adjustable foot stand 50 is attached to the support frame 24 underneath the baby seat 34. The foot stand 50 is optionally circular. A removable storage tray 52 is slidably disposed within the support frame 24 underneath the foot stand 50. An adjustable harness 54 has a top end 56 attached to a top edge 58 of the seatback 38 and a bottom end 60 selectively engageable with a safety latch 62 disposed on the seat base 40.

What is claimed is:

1. A wheeled baby carriage with an activity tray comprising:
- a collapsible wheeled carriage having a handle, a foldable support frame, a plurality of wheels, a rearward facing storage compartment attached to the support frame, a forward facing beverage tray hingedly attached to the handle, and a sunshade hingedly attached to the support frame;
- a baby seat having a circular seat support rotatably attached to the support frame, an immovable seatback disposed atop the seat support, an elasticized seat base continuously attached to the seat support, and a pair of apertures disposed within the seat base;
- wherein each of the pair of apertures is configured to allow the passage of each of a pair of legs of a baby;
- a circular tray continuously disposed atop the seat support, the tray having a first half and a removable second half selectively engaged with the first half, wherein a perimeter of the first half is equal to a perimeter of the second half;
- wherein the tray is configured to hold a plurality of interchangeable and removable toys and activities to entertain the baby;
- an adjustable foot stand attached to the support frame underneath the baby seat;
- a removable storage tray slidably disposed within the support frame underneath the foot stand; and
- an adjustable harness having a top end attached to a top edge of the seatback and a bottom end selectively engageable with a safety latch disposed on the seat base;
- wherein the harness is configured to hold the baby in the baby seat when the seat support of the baby seat is stationary;
- wherein the seat support of the baby seat is configured to allow the baby to circularly rotate in a range of 180 degrees to 360 degrees while the baby is sitting in the seat base of the baby seat.

2. The wheeled baby carriage with an activity tray of claim 1 wherein the plurality of wheels is four.

3. The wheeled baby carriage with an activity tray of claim 2 wherein the foot stand is circular.

* * * * *